H. DICKINSON.
RAIN VISION SHIELD.
APPLICATION FILED MAY 24, 1920.
1,428,014.
Patented Sept. 5, 1922.
5 SHEETS—SHEET 1.
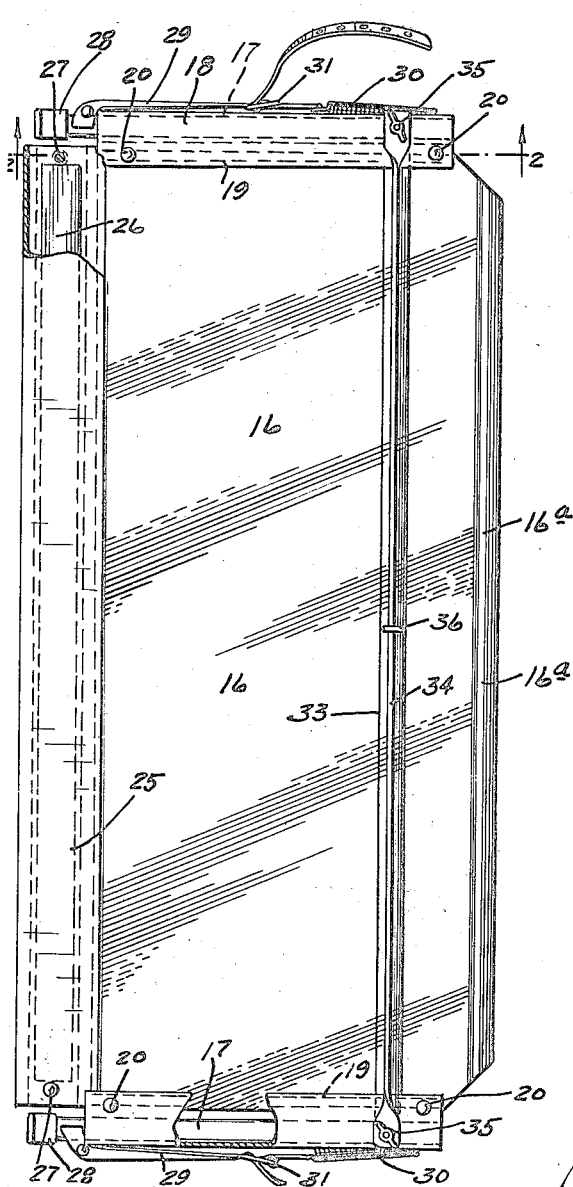
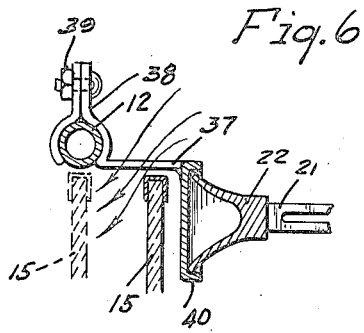
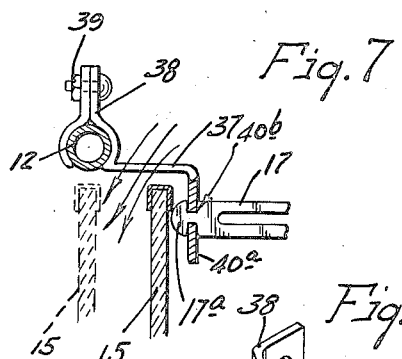
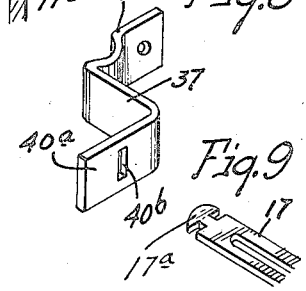
INVENTOR
Hal Dickinson
BY HIS ATTORNEYS H. DICKINSON.
RAIN VISION SHIELD.
APPLICATION FILED MAY 24, 1920.
1,428,014.
Patented Sept. 5, 1922.
5 SHEETS—SHEET 2.
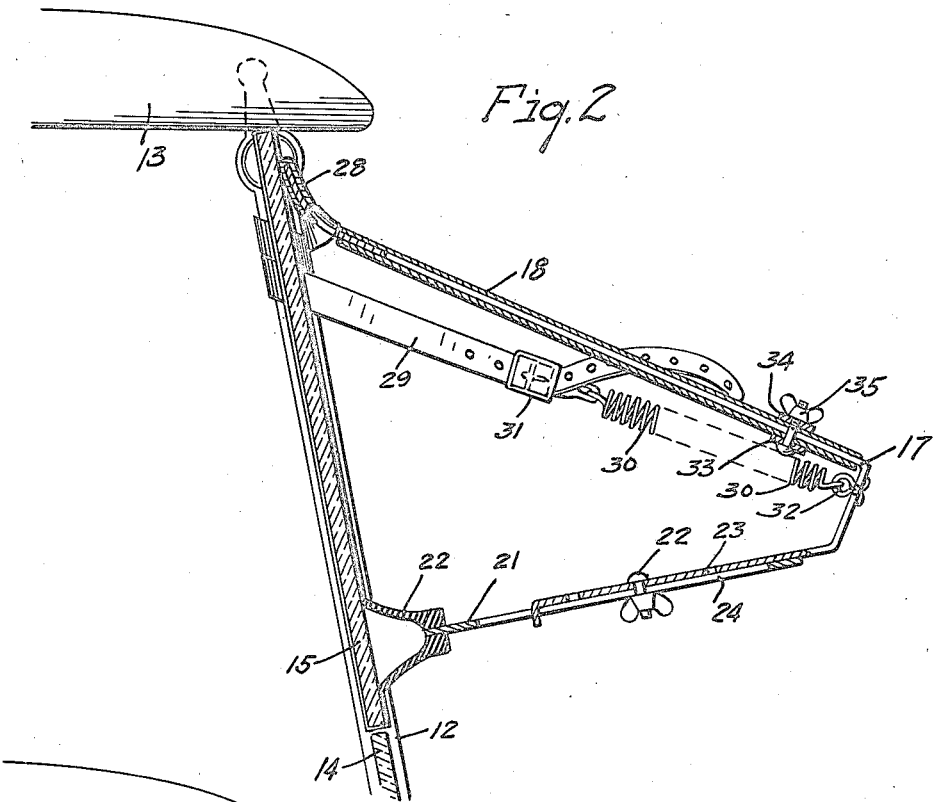
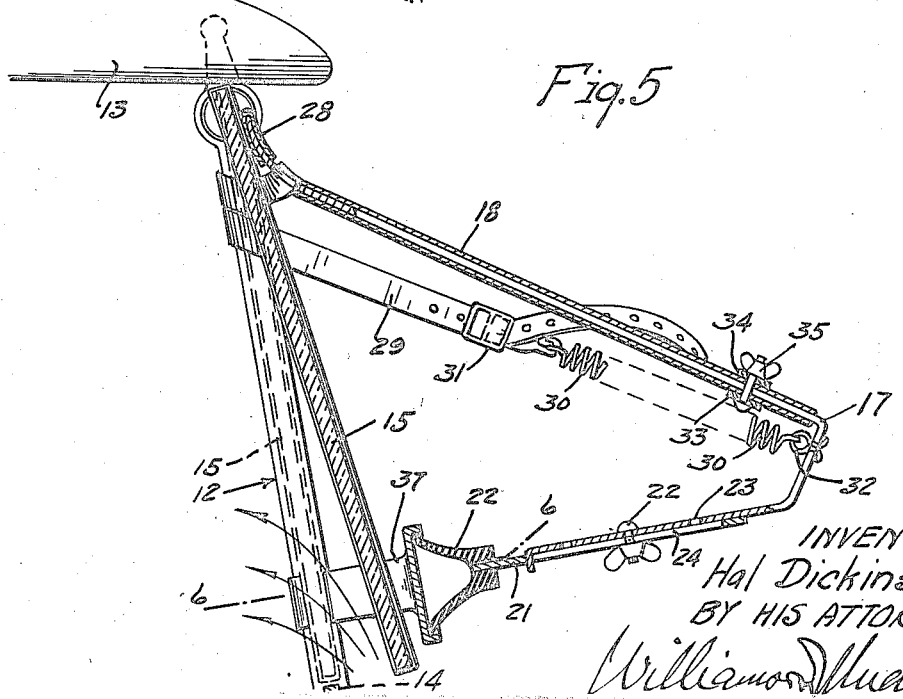
INVENTOR
Hal Dickinson
BY HIS ATTORNEYS

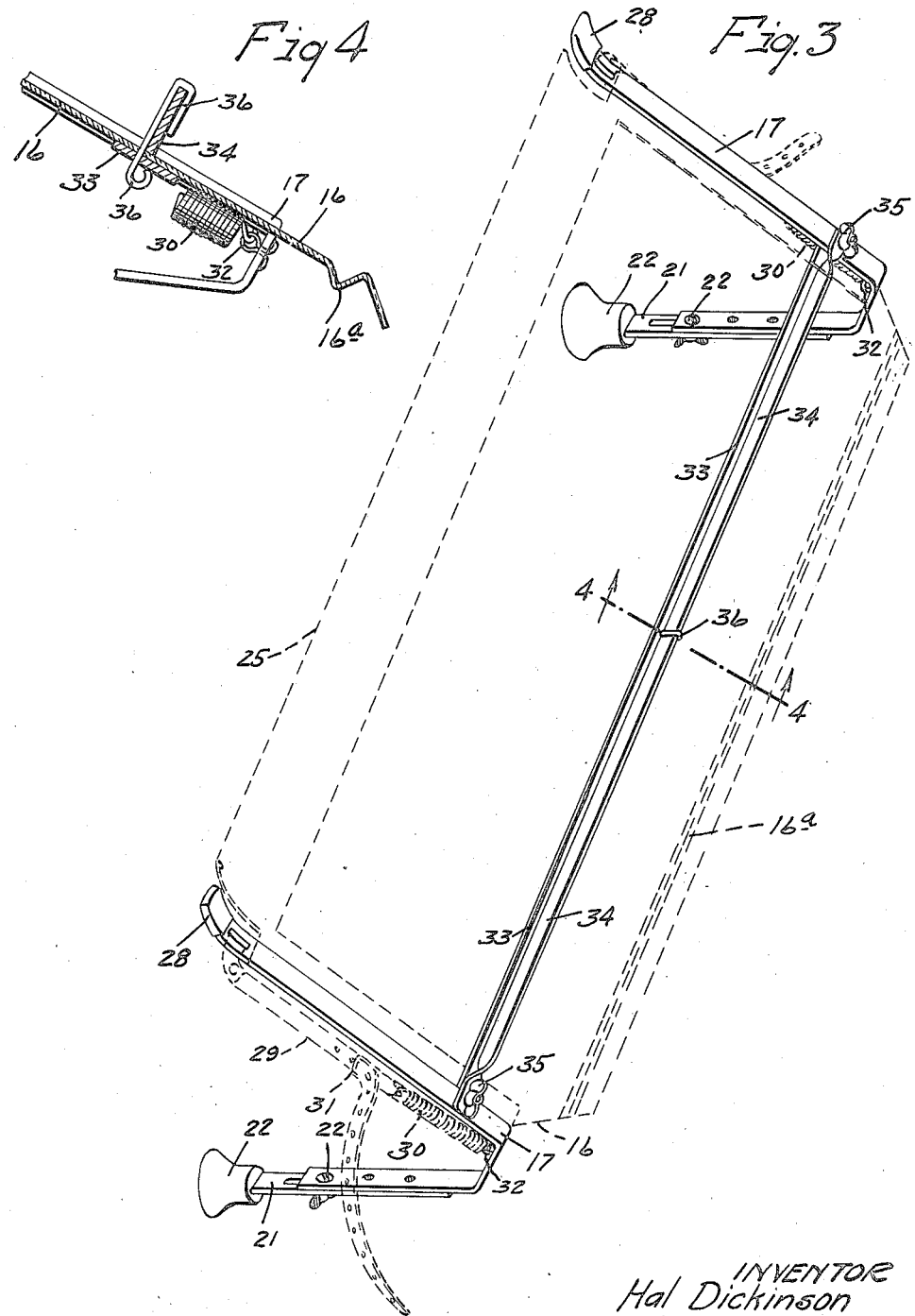

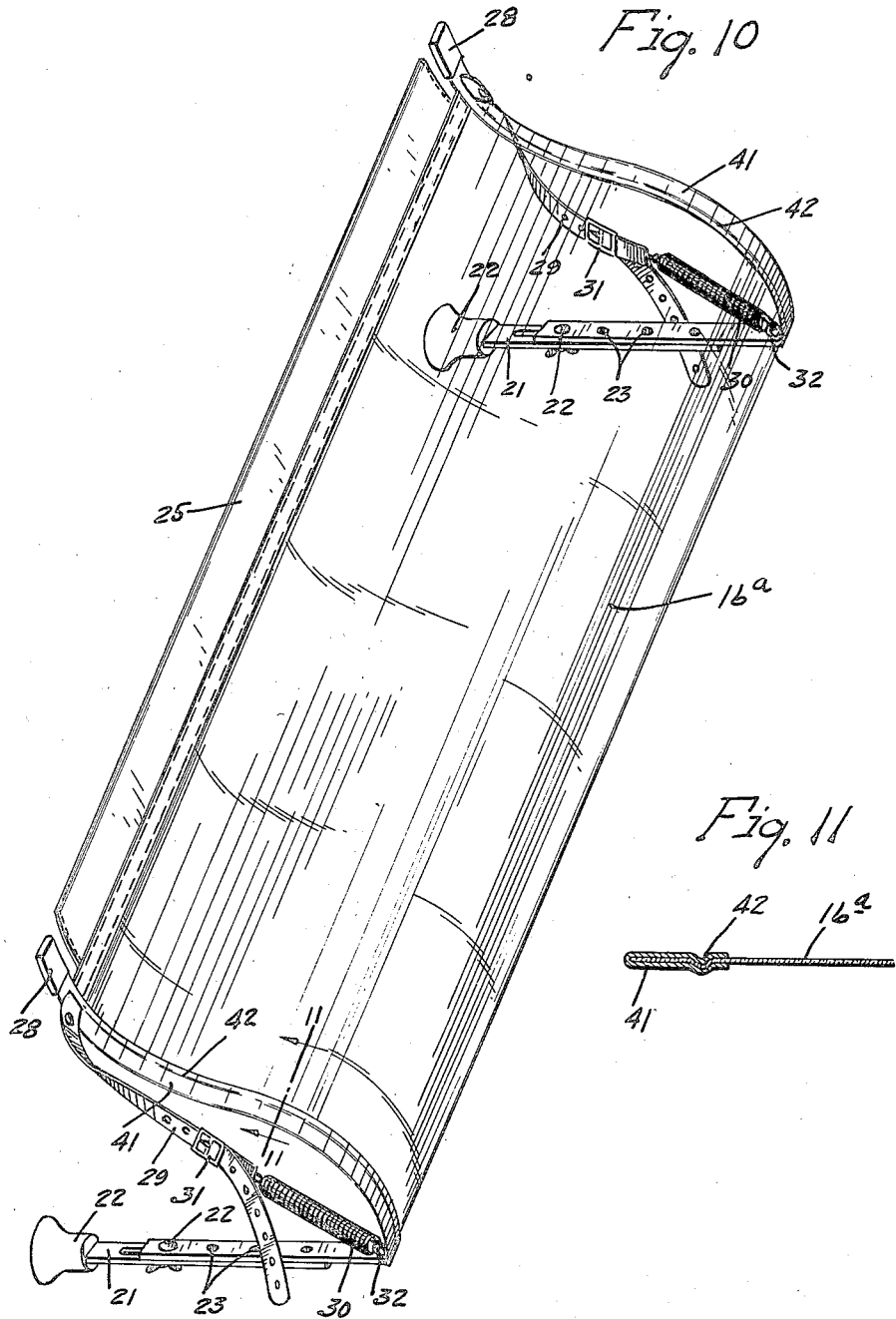

Patented Sept. 5, 1922.

1,428,014

UNITED STATES PATENT OFFICE.

HAL DICKINSON, OF MINNEAPOLIS, MINNESOTA.

RAIN VISION SHIELD.

Application filed May 24, 1920. Serial No. 383,699.

*To all whom it may concern:*

Be it known that I, HAL DICKINSON, a citizen of the United States, residing at Minneapolis, in the county of Hennepin and State of Minnesota, have invented certain new and useful Improvements in Rain Vision Shields; and I do hereby declare the following to be a full, clear, and exact description of the invention, such as will enable others skilled in the art to which it appertains to make and use the same.

My present invention relates to rain vision shields for automobiles and is in the nature of an improvement on or modification of the rain vision shield disclosed and claimed in my pending application, S. N. 334,679, filed October 31st, 1919.

The present invention, in common with the invention of my prior application, employs a flexible transparent or translucent main sheet, preferably of celluloid. The present invention, however, involves certain features for more effectively and conveniently attaching the shield to the automobile and for supporting the flexible transparent sheet in such manner that it will be held in shape and not be broken or distorted by wind or rain pressure.

In the accompanying drawings which illustrate the invention like characters indicate like parts throughout the several views.

Referring to the drawings:

Fig. 1 is a plan view of the rain vision shield detached from the car and some parts thereof being sectioned;

Fig. 2 shows the shield applied to a car, the shield being sectioned approximately on the line 2—2 of Fig. 1;

Fig. 3 is a perspective view of the shield, the celluloid main sheet thereof being indicated by dotted lines;

Fig. 4 is an enlarged section taken on the line 4—4 of Fig. 3;

Fig. 5 is a view corresponding to Fig. 2, but illustrating a slightly modified manner of applying the shield;

Fig. 6 is an approximately horizontal section taken on the line 6—6 of Fig. 5;

Fig. 7 is a view corresponding to Fig. 6, but illustrating a modified form of the connection between the lower arm of an end bracket and one of the wind shield posts;

Figs. 8 and 9 are details in perspective of the coupling elements shown in Fig. 7;

Fig. 10 is a perspective view illustrating a modified form of the shield;

Fig. 11 is an enlarged view taken in section on the line 11—11 of Fig. 10;

Figure 12:
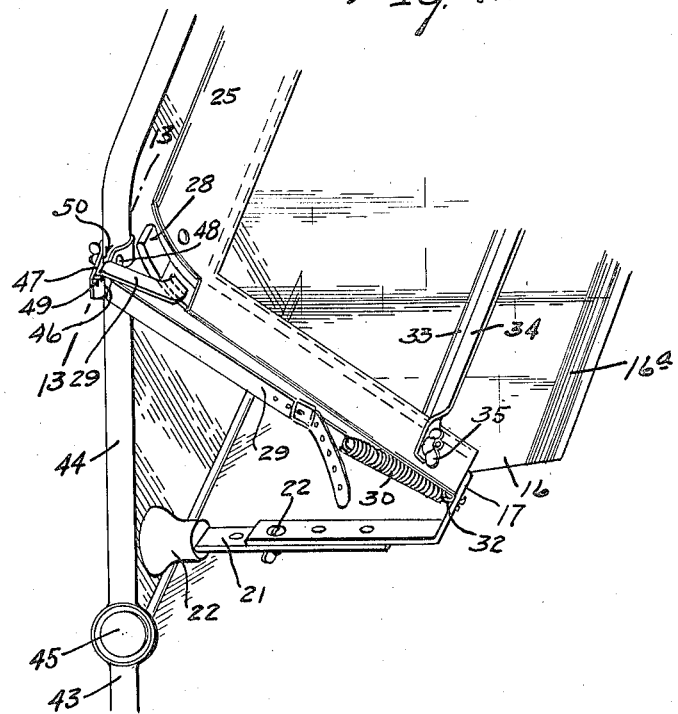
Fig. 12 is a perspective view illustrating the manner in which the shield may be attached to the wind shields, such as the Ford cars, that do not have wind shield posts.

Referring first to the construction illustrated in Figs. 1 to 4, inclusive, the numeral 12 indicates the windshield post, the numeral 13 the top, the numeral 14 the lower glass section, and the numeral 15 the upper glass section of the wind shield proper of the automobile or machine, the said parts noted being of standard construction.

The numeral 16 indicates the celluloid main sheet of the shield, the same being of approximately rectangular form, but the lower edge thereof being preferably crimped at 16ª to stiffen the same and form a transverse gutter to direct water outward of said sheet. The sheet 16 may be either clear, or transparent, or it may be tinted to prevent glare, and thus made semi-transparent or translucent, but should be clear enough so that objects on the road ahead of the machine may be observed.

At its ends, the main sheet 16 is attached to angle brackets that are provided with means for attaching the same to the wind shield posts, and other parts. These end brackets are formed with upper and lower arms that diverge rearwardly, or toward the main shield post, and the main sheet 16, at its end edges, is attached to the upper arms 17 of these brackets, preferably by binding strips 18 that are looped around said upper arms and are attached to said sheet preferably by stitches 19 and rivets 20. The lower arms of the end brackets are made longitudinally extensible by strap-like supplemental members 21. The overlapped portions of the lower arm sections are rigidly but adjustably tied together by nut-equipped bolts 22 adapted to be passed through either of several perforations 23 in the main portions of said lower arms and through slots 24 in the straps 21.

To the ends of the straps 21 are secured bearing heads in the form of rubber vacuum cups 22. The binding strips 18 are preferably of leather or similar flexible material. Similar pliable binding strips 25 are stitched, or otherwise, secured to the upper edge of the main sheet 16, and within the longitudinally extended pocket formed within the loop binding strip 25 is placed a thin long stiffening rib 26 of spring steel or other suitable material which is held against endwise displacement by rivets 27 applied at the ends of said strip 25. The upper ends of the upper arms 17 of the end brackets are extended through and above the end binding strips 18, are slightly curved upwardly and preferably provided with leather or other pliable covering caps 28 that are adapted to bear against the end portions of the upper wind shield section 15 at points near its pivot. By reference to Fig. 1, it will be noted that the caps 28 on the upper ends of the upper arms of the end brackets are aligned with, but spaced outward slightly from the ends of the upper binding strip 25; and here it may be noted that the said binding strip 25, with its reinforcing rib, forms a flexible joint flap at the upper edge of the main sheet 16 which is adapted to closely but yieldingly engage the upper wind shield section 15, under the forwardly projecting portion of the vehicle top.

As shown in Fig. 2, the cup-like heads 22 are applied directly against the glass of the upper wind shield section 15 and the action of vacuum or suction therein will assist in holding the same in position, and moreover, the heads being of rubber, will cushion the shocks that would otherwise be produced in the glass of the shield.

As a means for securely, but detachably holding the storm shield in position, I provide straps 29 and coiled springs 30. The straps 29, at their upper ends, are attached by rivets, or otherwise, to the projected ends of the upper arms of the end brackets and are adapted to be wound about the upper portions of the wind shield posts 12. The extended perforated ends of the straps 29 are provided with adjustable buckles 31 to which the rear ends of the springs 30 are attached, the outer ends of the said springs being anchored to the outer portions of the end brackets by anchoring eyes 32, or other means. When the straps and springs are applied and the buckles moved to tighten the straps and stretch the springs, the rain shield will be securely held in position, as illustrated in Fig. 2.

In the use of earlier form of this storm shield, I found that wind and rain pressure would sometimes badly distort and ultimately damage the celluloid sheet, and to prevent this, I have provided a transverse bridge bar that accomplishes several purposes, to wit: it keeps the outer portion of the end brackets properly spaced and rigidly connected and holds the lower or forward portion of the celluloid sheet properly stretched on a straight line and prevents the same from being distorted or damaged by wind or rain pressure, or from sagging by its own weight. As shown and preferred, this bridge bar is made up of two flat metal straps 33 and 34, placed, the former below and the latter above the sheet 16, and provided with parallel ends rigidly clamped to the end binding strips 18 and the upper arms of the end brackets by nut-equipped bolts 35. The lower strap 33 engages the sheet 16 flatwise, but the main portion of the upper strap 34 is turned into a plane perpendicular to the sheet 16 and engages the same edgewise. The intermediate portions of the two straps 33 and 34 (see Fig. 4, but note also Fig. 1), are connected by a wire clasp 36 applied through the strap 33 and sheet 16 and hooked around the strap 34.

Obviously, the rain shield described, when attached in the manner above stated, will be very securely supported in proper position, but with the heads 22 engaging with the upper shield section 15, it is not practicable to move the latter for ventilating, or other purposes. To provide for movements of the shield section 15 with the storm shield applied, bearing brackets 37 (see Figs. 5 and 6) that are detachably anchored to the wind shield post 12, by clamping heads 38 and nut-equipped clamping bolts 39. The brackets 37 are projected forwardly from the post 12 and are provided with socket-like faces 40 against which the bearing heads 22 are adapted to be directly pressed.

In Figs. 7, 8 and 9, the brackets 37 are, as previously described, except that in lieu of the bearing faces 40, they are formed with laterally bent ends 40$^a$ having slots 40$^b$. For engagement with these bearing brackets shown in Figs. 7, 8 and 9, the upper arms 17 are provided with T-shaped heads 17$^a$ adapted to be inserted into the slots 40$^b$ and to be interlocked with the bracket ends 40$^a$, by rotation.

The storm shield shown in Figs. 10 and 11 is like that already described, except that the celluloid main sheet 16 is bent so that, in cross section, it forms an ogee curve. This formation, in itself, very greatly stiffens celluloid sheet of the shield. In this form of the shield, its lower edge is shown as provided with a thin sheet metal reinforcement in the form of a fold 41 that embraces its edge and is secured thereto by creases 42 (see Fig. 11).

Figure 13:
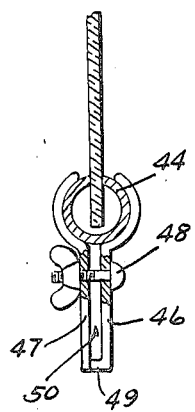
Fig. 13 is a detail in horizontal section on the line 13—13 of Fig. 12.

The importance of making the lower arms of the end brackets longitudinally adjustable is to adapt the brackets to properly support the transparent main sheet at the proper angle of inclination, regardless of whether the wind shield posts and the wind shield proper are set vertically or inclined; also, on the same automobile, some persons will desire a shield to be set higher or lower than others and the adjustments of the lower arms of the end brackets makes this also possible.

other cars of other makes, and especially the Cars of the Ford type and a number of older cars, do not have wind shield posts, and in Figs. 12 and 13 I have illustrated the manner in which this rain vision shield may be applied to such wind shields. In the said views, the numeral 43 indicates the lower section and the numeral 44 the upper section of the wind shield, the said sections being hingedly connected at 45 for oscillatory movements of the upper section 44 on the said hinges. For the application of the rain vision shield, I provide two-part clamps 46—47 having co-operating curved ends for clamping engagement with the frame of the upper shield section 44. The nut-equipped bolts 48 pass through the co-operating clamping sections 46—47 and serve to rigidly secure the clamps to the wind shield frame. By reference, particularly, to Fig. 13, it will be noted that the clamping section 46 has an offset end lug 49 that engages the outer end of the section 47 and affords a strap passage 50. There will, of course, be one of these clamps applied at each side of the upper portion of the frame of the shield section 44.

The straps 29, in this arrangement, are passed through the strap passages 50 to anchor the upper portion of the storm vision shield to the wind shield section 44. The bearing heads 22 will directly engage the glass of the section 44 and the springs 30, when the straps are tightened, will securely hold the rain vision shield in working position. In this arrangement, of course, the rain vision shield will partake of any pivotal movements given to the upper section of the wind shield.

What I claim is:

1. An attachable rain vision shield for vehicles including a main sheet, the front edge portion of which is longitudinally crimped to form a gutter and then turned downward at the outer edge of the gutter to form a deflecting flange which projects below the plane of the main sheet.

2. An attachable rain vision shield for vehicles including a main sheet, the front edge portion of which is longitudinally crimped to form a gutter and then turned downward at the outer edge of the gutter to form a deflecting flange which projects both above and below the plane of the main sheet.

3. An attachable rain vision shield for vehicles including a transparent or translucent main sheet, and a bridge-bar comprising upper and lower members between which said main sheet extends, and means for securing the bridge-bar members to the main sheet near its free edge portion to stiffen the same.

In testimony whereof I affix my signature.

HAL DICKINSON.